US012098054B2

(12) United States Patent
Yumoto et al.

(10) Patent No.: US 12,098,054 B2
(45) Date of Patent: Sep. 24, 2024

(54) RECORDING APPARATUS AND TRANSPORT APPARATUS

(71) Applicant: SEIKO EPSON CORPORATION, Tokyo (JP)

(72) Inventors: Yuya Yumoto, Shiojiri (JP); Junpei Yamashita, Azumino (JP); Osamu Murayama, Yamagata-Mura (JP); Shinya Yamazaki, Asahi-Mura (JP); Nobuaki Kamiyama, Matsumoto (JP); Shigenori Nakagawa, Tatsuno-Machi (JP)

(73) Assignee: Seiko Epson Corporation, Tokyo (JP)

( * ) Notice: Subject to any disclaimer, the term of this patent is extended or adjusted under 35 U.S.C. 154(b) by 83 days.

(21) Appl. No.: 17/820,648

(22) Filed: Aug. 18, 2022

(65) Prior Publication Data

US 2023/0057854 A1 Feb. 23, 2023

(30) Foreign Application Priority Data

Aug. 20, 2021 (JP) ................................ 2021-134651

(51) Int. Cl.

*B41J 15/00* (2006.01)
*B41J 11/42* (2006.01)
*B65H 5/02* (2006.01)
*B65H 7/02* (2006.01)

(52) U.S. Cl.

CPC .............. *B65H 5/021* (2013.01); *B41J 11/42* (2013.01); *B65H 7/02* (2013.01); *B65H 2404/5391* (2013.01); *B65H 2553/30* (2013.01)

(58) Field of Classification Search

CPC ........ B41J 3/4078; B41J 11/007; B41J 11/42; B41J 15/00; B41J 15/048; B41J 29/17; B65H 5/021; B65H 7/02; B65H 20/06; B65H 2301/511; B65H 2301/51122; B65H 2301/5323; B65H 2701/174; B65H 2553/30; B65H 2404/5391; B65H 2801/15

See application file for complete search history.

(56) References Cited

U.S. PATENT DOCUMENTS 5,764,264 A * 6/1998 Takanaka ............... B41J 3/4078 242/562
9,156,289 B2 * 10/2015 Nakamura ........... B65H 23/198
11,225,095 B2 * 1/2022 Kitahara .................. B65H 7/06
11,383,542 B2 * 7/2022 Kitagishi ............... B65H 29/54
11,789,386 B2 * 10/2023 Yumoto ............ G03G 15/0189 399/34

FOREIGN PATENT DOCUMENTS

JP 07-214767 8/1995
JP 2006-315824 A 11/2006
JP 2020063133 A * 4/2020 ............ B65G 43/00

* cited by examiner

*Primary Examiner* — Leslie A Nicholson, III
(74) *Attorney, Agent, or Firm* — WORKMAN NYDEGGER

(57) ABSTRACT

A recording apparatus includes a recording section capable of recording on a medium, a transport belt that is provided with adhesive capable of adhering with the medium and that is capable of transporting the medium, an ultrasonic sensor that transmits ultrasonic waves to the surface of the adhesive and that receives ultrasonic waves reflected from the surface, and a controller capable of determining the state of the surface based on the detection result of the ultrasonic sensor.

5 Claims, 7 Drawing Sheets

RECORDING APPARATUS AND TRANSPORT APPARATUS

The present application is based on, and claims priority from JP Application Serial Number 2021-134651, filed Aug. 20, 2021, the disclosure of which is hereby incorporated by reference herein in its entirety.

BACKGROUND

1. Technical Field

The present disclosure relates to a recording apparatus and a transport apparatus.

2. Related Art

As shown in JP-A-2006-315824, there is known a recording apparatus that uses a detection roller that contacts a transport belt, with an adhesive property, to detect changes in the adhesiveness.

However, in the recording apparatus described in JP-A-2006-315824, since the detection roller contacts the transport belt during detection, there is a possibility that the adhesiveness will deteriorate.

SUMMARY

A recording apparatus includes a recording section configured to record on a medium, a transport belt that is provided with an adhesive adherable with the medium and that is configured to transport the medium, an ultrasonic sensor that transmits ultrasonic waves to a surface of the adhesive and that receives ultrasonic waves reflected from the surface, and a controller configured to determine a state of the surface based on a detection result of the ultrasonic sensor.

A transport apparatus includes a transport belt that is provided with an adhesive adherable with the medium and that is configured to transport a medium, an ultrasonic sensor including a transmission section that transmits ultrasonic waves to a surface of the adhesive and a reception section that receives ultrasonic waves reflected from the surface, and a controller configured to determine a state of the surface based on a detection result of the ultrasonic sensor.

DESCRIPTION OF EMBODIMENT

1. Embodiment

Figure 1:
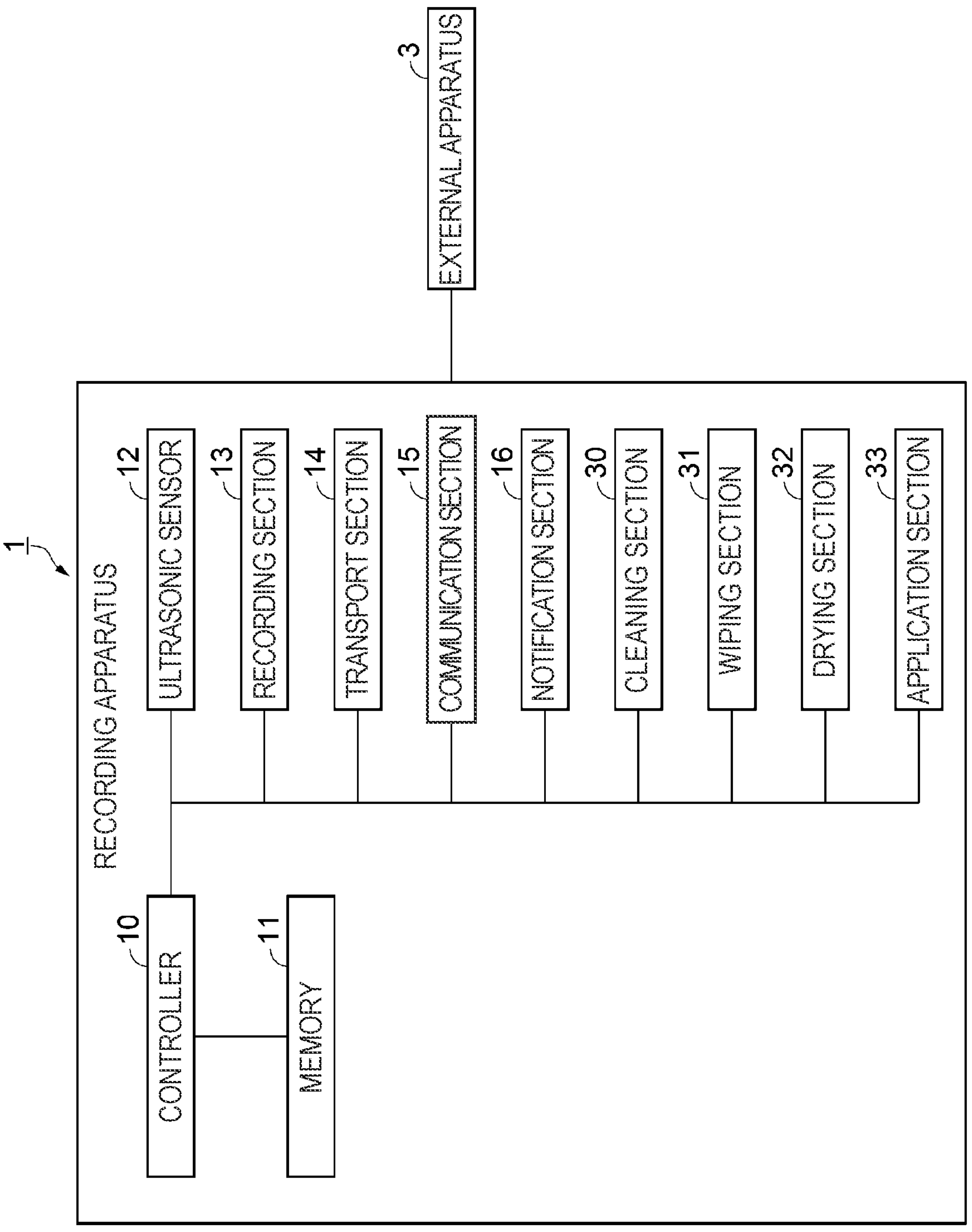
FIG. 1 is a block diagram showing configuration of a recording apparatus according to an embodiment.

Hereinafter, an embodiment will be described with reference to the drawings. Note that directions in the drawings will be described using a three dimensional coordinate system in which an X axis, a Y axis, and a Z axis are orthogonal to each other. In this case, a direction along the X axis is defined as an X direction, a direction along the Y axis is defined as a Y direction, and a direction along the Z axis is defined as a Z direction. For convenience of explanation, the positive direction of the Z direction is referred to as an upward direction or simply upward, the negative direction is referred to as a downward direction or simply downward, the positive direction of the X direction is referred to as a rightward direction or simply right, the negative direction is referred to as a leftward direction or simply left, the positive direction of the Y direction is referred to as a forward direction or simply forward, and the negative direction is referred to as a rearward direction or simply rearward.

1-1. Configuration of Recording Apparatus

As shown in FIG. 1, a recording apparatus 1 includes a controller 10, a memory 11, an ultrasonic sensor 12, a recording section 13, a transport section 14, a communication section 15, a notification section 16, a cleaning section 30, a wiping section 31, a drying section 32, and an application section 33. The configuration of the recording apparatus 1 will be described with reference to FIG. 2.

Figure 7:
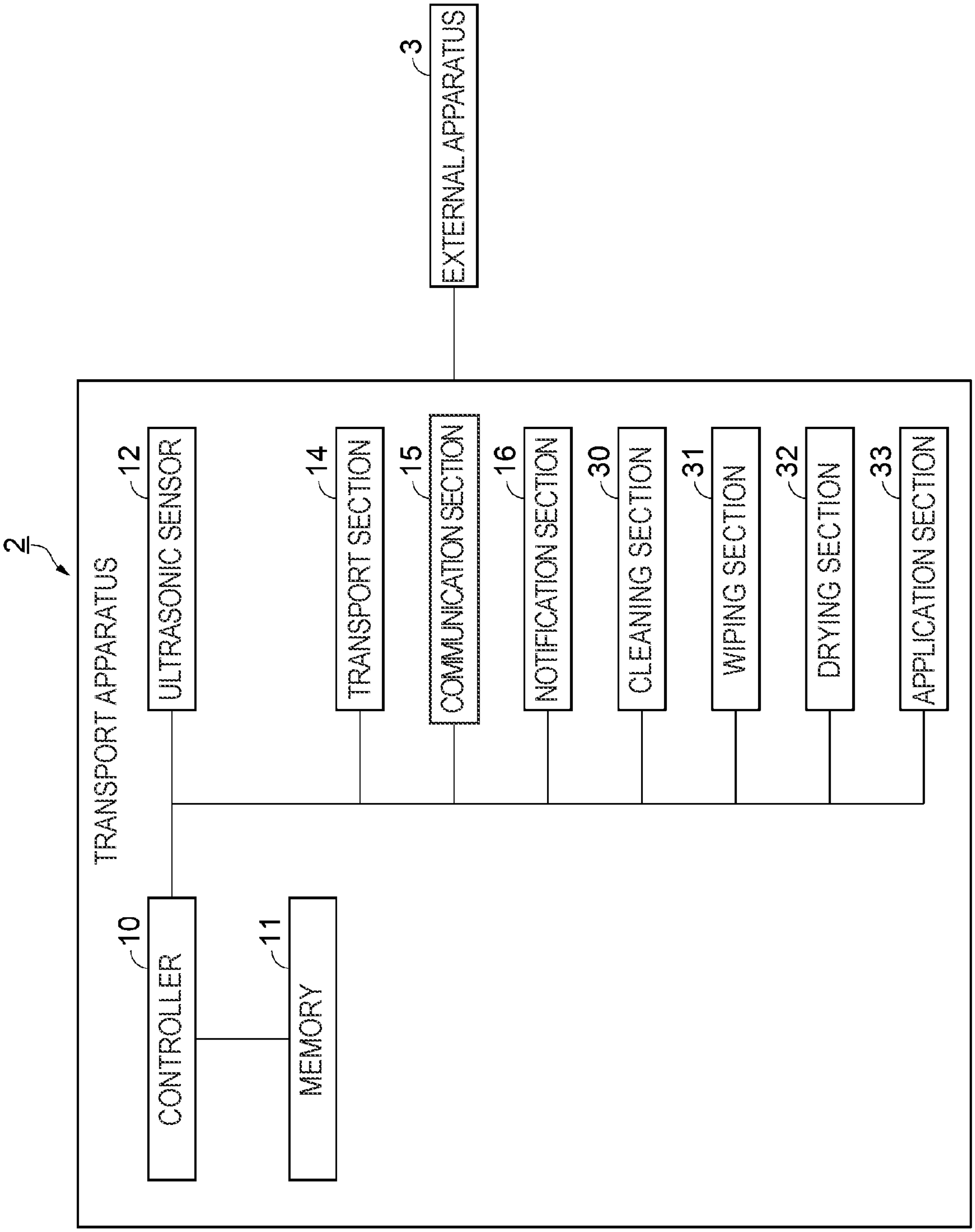
FIG. 7 is a block diagram showing configuration of a transport apparatus according to an embodiment.
Figure 8:
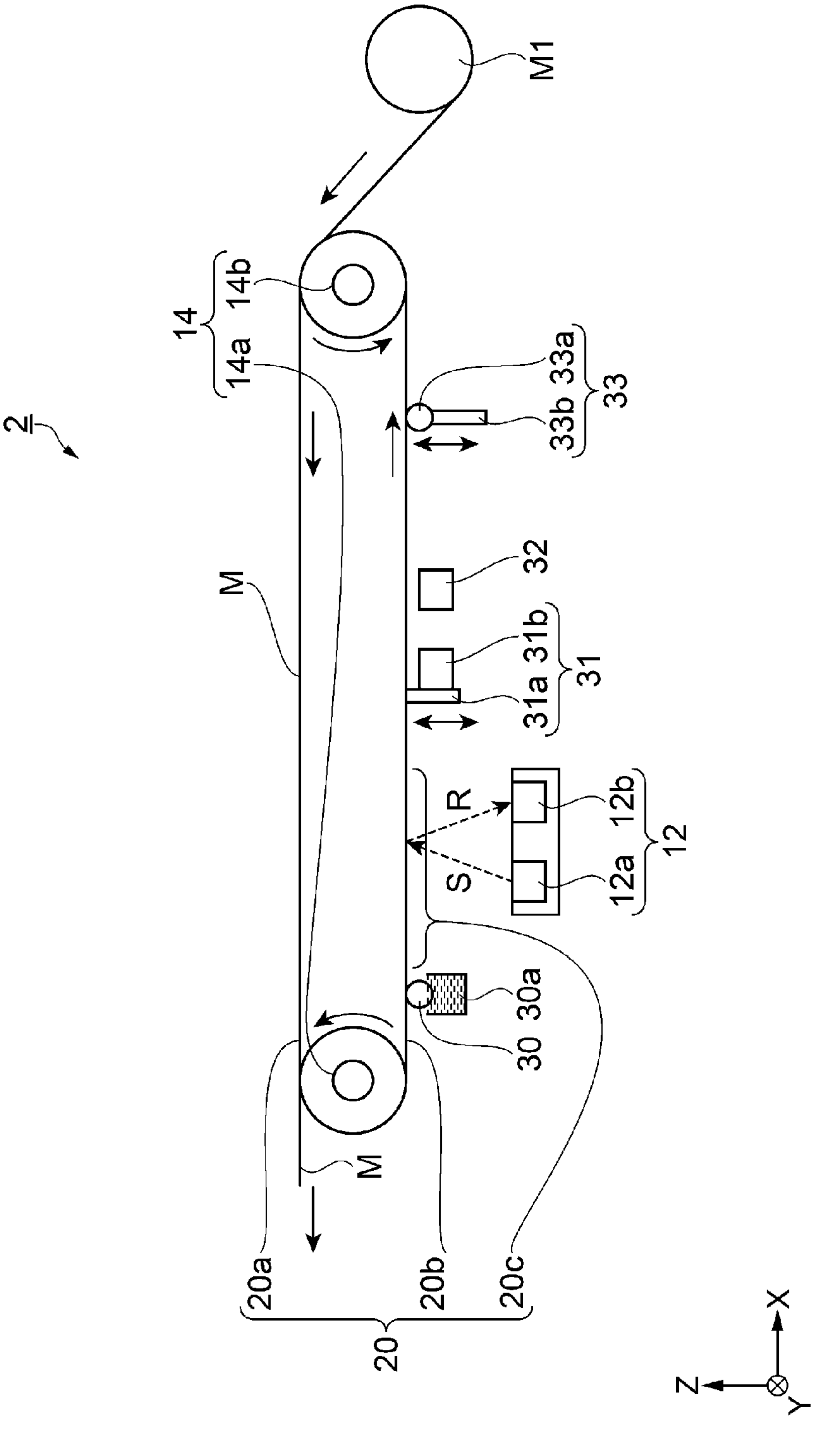
FIG. 8 is a schematic diagram showing configuration of the transport apparatus according to the embodiment.

As shown in FIGS. 7 and 8, a transport apparatus 2 has configuration in which at least the recording section 13 is removed from the recording apparatus 1. The configuration of the transport apparatus 2 is the same as that of the recording apparatus 1 described below except for the recording section 13.

The controller 10 includes a central processing section (CPU) that integrally controls each section of the recording apparatus 1, a universal asynchronous receiver transmitter (UART) that manages input and output, a field programmable gate array (FPGA) or a programmable logic device (PLD) that is a logic circuit, and the like. The CPU is also referred to as a processor.

The memory 11 includes a flash read only memory (ROM) or a hard disk drive (HDD) which is a rewritable nonvolatile memory, a random access memory (RAM) which is a volatile memory, and the like.

The CPU of the controller 10 reads a program such as firmware stored in the nonvolatile memory of the memory 11, and executes the program using the RAM of the memory 11 as a work area.

Figure 2:
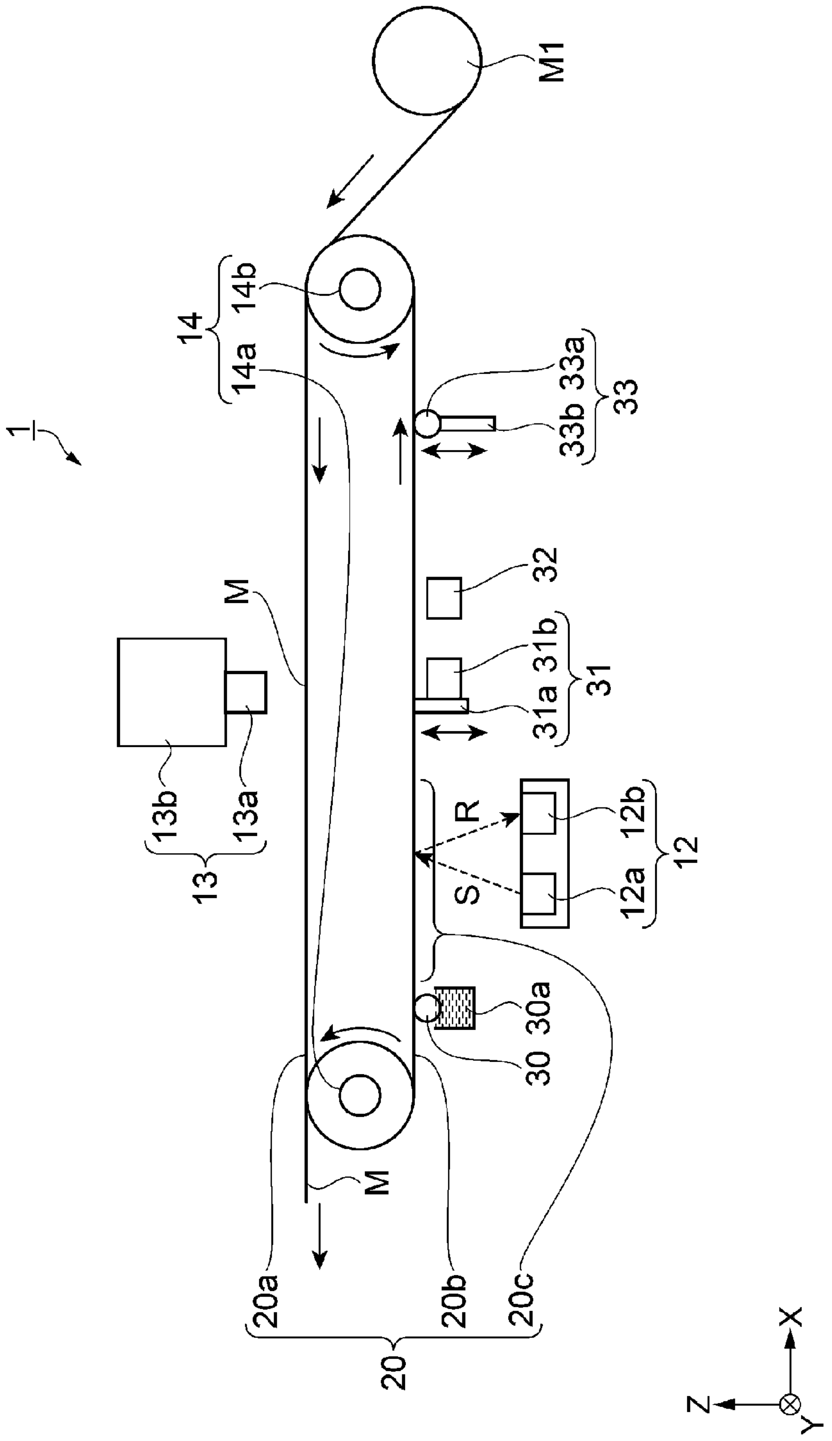
FIG. 2 is a schematic diagram showing configuration of the recording apparatus according to the embodiment.

The medium M illustrated in FIG. 2 is, for example, an elongated fabric formed of natural fibers or synthetic fibers. The elongated fabric is also referred to as a whole cloth. The recording apparatus 1 performs recording on the medium M. Recording on the fabric is also referred to as printing, and the medium M is also referred to as a material to be printed on. Note that the medium M may be plain paper, synthetic paper, film, or the like.

As shown in FIG. 2, the transport section 14 includes an endless transport belt 20, a driving roller **14*a*, and a driven roller 14*b*. The transport section 14 rotates the driving roller 14*a* counterclockwise by a conveying motor (not shown), and the driven roller 14*b* also rotates counterclockwise following the driving roller 14*a*. The transport belt 20 spanning across the driving roller 14*a* and the driven roller 14*b* also rotates in the counterclockwise direction, which is the circling direction. The driving roller 14***a* and the driven roller 14*b* may be reversed in their driving and driven relationship.

As shown in FIG. 2, assuming that the driving roller 14*a* of the transport section 14 is the starting point, the cleaning section 30, the ultrasonic sensor 12, the wiping section 31, the drying section 32, the application section 33, and the recording section 13 are disposed in this order from upstream to downstream in the circling direction of the transport belt 20. The order opposite to this order is the order from downstream to upstream of the circling direction of the transport belt 20.

In addition, with respect to the circling direction of the transport belt 20, the direction in which the medium M is mounted onto the transport belt 20 and moves from the driven roller 14*b* toward the driving roller 14*a* is referred to as the forward direction, and a direction in which the medium M is peeled and moves from the driving roller 14*a* toward the driven roller 14*b* is referred to as the return direction.

As will be described later, glue G, which is an adhesive having an adhesive property, is provided on the surface of the transport belt 20, and the medium M can adhere to the glue G. The glue G includes, for example, a silicone resin.

As shown in FIG. 2, the portion of the transport belt 20 moving in the forward direction is referred to as a forward belt surface 20*a*, and the portion of the transport belt 20 surface moving in the return direction is referred to as a return belt surface 20*b*.

The transport belt 20 can adhere and fix in place the medium M by the glue G and stably transport the medium M. In addition, the transport belt 20 enables easy peeling off of the medium M after recording.

Under the control of the controller 10, the medium M drawn out from the roll body Ml, which is wound in a roll, is mounted onto the forward belt surface 20*a* of the transport section 14 and transported.

The transport section 14 may include at least one of a feeding device that pulls the medium M out from the roll body Ml at a position close to the driven roller 14*b* or a winding device that winds up the medium M that was peeled off from the forward belt surface 20*a* at a position close to the driving roller 14*a*.

As shown in FIG. 2, the recording section 13 includes an ink jet head 13*a* and a carriage 13*b*. The carriage 13*b* includes a carriage motor. The recording apparatus 1 can be mounted with ink cartridges or ink tanks storing ink of each color of, for example, cyan, magenta, yellow, and black (CMYK) as ink colors.

The recording section 13 includes a supply mechanism that supplies ink from an ink cartridge or the like to the head. The supply mechanism supplies ink of each color from an ink cartridge or the like to a corresponding nozzle of the head 13*a*.

The head 13*a* is mounted on the carriage 13*b* and is reciprocated together with the carriage 13*b* by a carriage motor in the front-rear direction over the medium M. The head 13*a* is, under control based on recording data by the controller 10, capable of recording on the medium M by ejecting ink from nozzles while moving over the medium M.

The ink colors may be any combination of four or more colors including, for example, dark and light CMYK colors.

In addition, the head 13*a* may be configured to include nozzles that eject a penetrant liquid onto the medium M. A penetrant liquid is a liquid that promotes penetration of ink adhered to the front surface of the medium M toward the back surface.

The cleaning section 30 is provided downstream from the driving roller 14*a* in the circling direction of the transport belt 20. The cleaning section 30 can remove ink, foreign matter, and the like clinging to the return belt surface 20*b* of the transport section 14 on which recording by the recording section 13 has finished and from which the medium M has been peeled off.

The cleaning section 30 includes a cleaning brush and a brush rotating motor (not shown) that rotates the cleaning brush. Under the control of the controller 10, the cleaning section 30 can clean by rotating the cleaning brush while spraying supplied cleaning liquid, which is a liquid such as water, onto the cleaning brush and bringing the cleaning brush into contact with the returning belt surface 20*b*.

A cleaning vessel 30*a* discharges the cleaning liquid while storing the cleaning liquid so that the liquid level stays constant. The cleaning brush of the cleaning section 30 is immersed at a certain depth in the cleaning liquid stored in the cleaning vessel 30*a* to remove foreign matter and the like attached during cleaning.

The cleaning brush may be a rotating brush, a cylindrical cloth, sponge, or brush, a rubber or resin plate, or the like.

As shown in FIG. 2, the at least one ultrasonic sensor 12 includes a transmission section 12*a*, which is a transmitter for transmitting a transmission wave S, and a reception section 12*b*, which is a reception section for receiving a reception wave R. The ultrasonic sensor 12 uses, for example, 30 kHz to 10 MHz ultrasonic waves. The transmission wave S transmitted from the transmission section 12*a* is reflected from the return belt surface 20*b*, becoming the reception wave R, which is received by the reception section 12*b*.

The ultrasonic sensor 12 can detect the distance to the return belt surface 20*b* in a non-contact manner by using the time from when the transmission section 12*a* transmits the transmission wave S to when the reception section 12*b* receives the reception wave R. The controller 10 can easily and accurately determine the state of the return belt surface 20*b* by using the understanding that the detection result of the ultrasonic sensor 12 varies depending on the state of the return belt surface 20*b*.

Specifically, in the case where ultrasonic waves are transmitted from the transmission section 12*a* of the ultrasonic sensor 12 toward a glue surface GS (to be described later), which is the surface of the glue G on the return belt surface 20*b*, when the glue G is consumed by peeling, then, compared to when the glue G is not consumed, the time until the reception section 12*b* receives the ultrasonic waves that were reflected by the glue surface GS and returned becomes longer, and the distance detected by the ultrasonic sensor 12 becomes longer. The glue G is consumed when, for example, the medium M is peeled off from the forward belt surface 20*a* or the return belt surface 20*b* is cleaned by the cleaning section 30.

Using the distance detected by the ultrasonic sensor 12 with respect to at least a part of the return belt surface 20*b*, the controller 10 can determine the degree of deterioration of the glue G on the entire transport belt 20.

As described above, according to the ultrasonic sensor 12 of the embodiment, since ultrasonic waves are used, it is possible to detect, in a non-contact manner, a state in which the glue G of the transport belt 20 has been consumed by being peeled off. Therefore, the ultrasonic sensor 12 can perform detection without influencing the glue G on the transport belt 20.

The ultrasonic sensor 12 is configured to be able to detect a detection target region 20*c*, which is at least a portion of the return belt surface 20*b* from downstream of the cleaning section 30 to upstream of the wiping section 31 with respect to the circling direction of the transport belt 20.

With respect to the return belt surface 20*b* cleaned by the cleaning section 30, the distance to the return belt surface 20*b* is detected by the ultrasonic sensor 12 in the detection target region 20*c*. The controller 10 can determine, according to the detection result of the ultrasonic sensor 12, that is, based on the detection result of the ultrasonic sensor 12, the state of the return belt surface 20*b*, for example, the state of the thickness of the glue G on the return belt surface 20*b* or the state in which foreign matter, such as droplets of cleaning liquid, adhere to the return belt surface 20*b*.

The detection distance and sensitivity of the ultrasonic sensor 12 can be adjusted by the output power of the transmission wave S of the transmission section 12*a*, or the like.

As described above, the ultrasonic sensor 12 is configured to be able to detect the returning belt surface 20*b* in a non-contact manner and also to be able to adjust the detection distance. Therefore, the ultrasonic sensor 12 may be at any position as long as it can transmit and receive ultrasonic waves to and from the detection target region 20*c* of the transport belt 20, and may not be at the position shown in FIG. 2. For example, the ultrasonic sensor 12 may be disposed upstream of the cleaning section 30 or may be disposed downstream of any of the wiping section 31, the drying section 32, and the application section 33.

Here, an example in which the controller 10 determines the state of the thickness of the glue G, which is the state of the return belt surface 20*b*, based on the detection result of the ultrasonic sensor 12 will be described with reference to FIG. 3.

The ultrasonic sensor 12 can detect the distance D to the return belt surface 20*b*, which is the target of detection, based on the speed of the ultrasonic wave being used and on the time from transmission of the transmission wave S to reception of the reception wave R.

The controller 10 may control the ultrasonic sensor 12 to transmit the transmission wave S and receive the reception wave R, acquire the intervening time, and, based on the speed of the ultrasonic wave, calculate the distance D to the return belt surface 20*b*.

Figure 3:
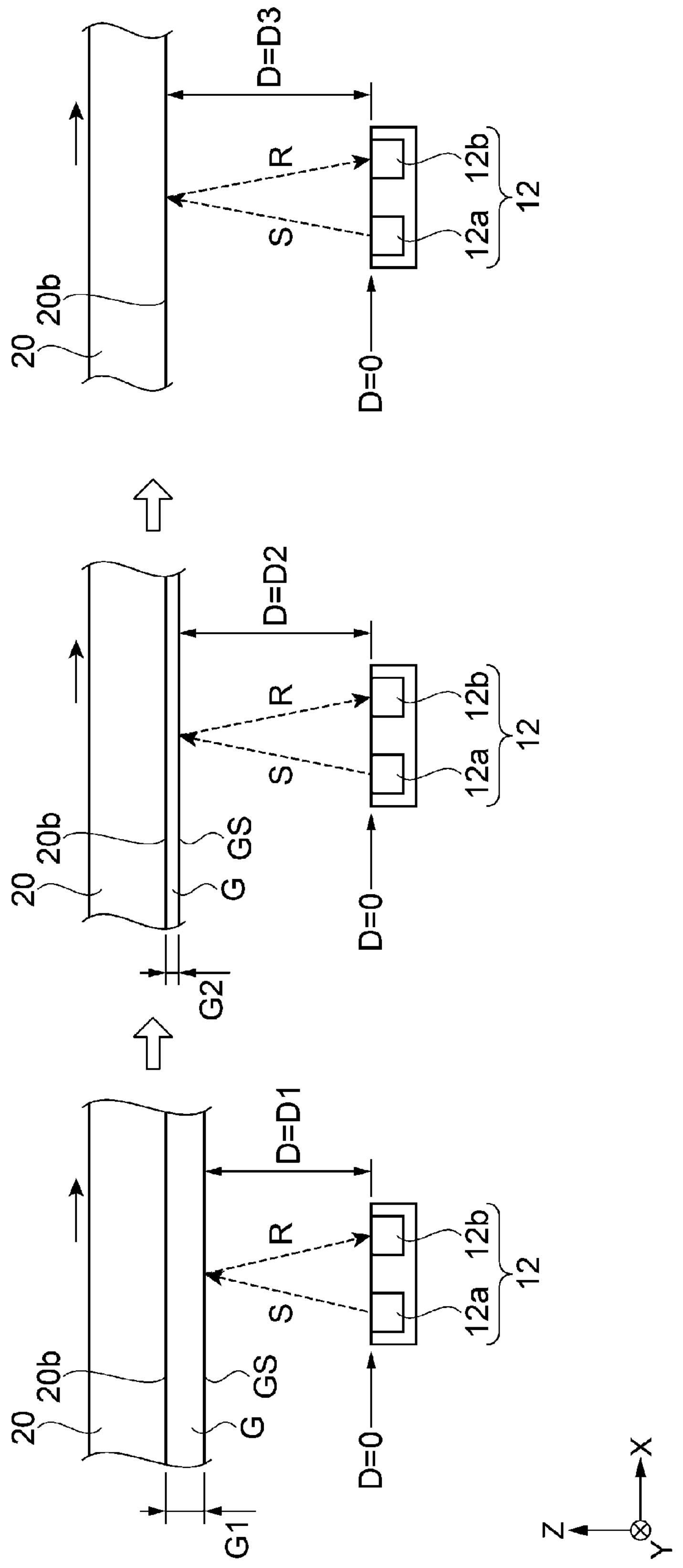
FIG. 3 is a diagram showing an example of detection of glue by an ultrasonic sensor.

FIG. 3 shows three configurations in which the thickness of the glue G on the return belt surface 20*b* is different. As shown in FIG. 3, when the ultrasonic sensor 12 uses the transmission section 12*a* to transmit a transmission wave S toward the return belt surface 20*b*, the transmission wave S is reflected from the glue surface GS, which is the surface of the glue G, becoming a reception wave R that is received by the reception section 12*b*.

In the Z-axis of the coordinates shown in FIG. 3, the distance from the position of the ultrasonic sensor 12 to the return belt surface 20*b*, which is the target of detection, is referred to as the distance D detected by the ultrasonic sensor 12. Note that the position of the ultrasonic sensor 12 is at "distance D=0".

The left form in FIG. 3 shows a state in which the glue G on the return belt surface 20*b* is sufficient. For example, the glue G is about 0.2 to 0.3 mm thick. It shows a new product in which the glue G of the transport belt 20 is sufficiently provided or a state in which the user sufficiently applied the glue G to the transport belt 20.

In a state where the glue G is sufficient on the return belt surface 20*b*, the ultrasonic sensor 12 can detect the distance D from the position of the ultrasonic sensor 12 to the return belt surface 20*b* as a first distance D1, based on the time from the transmission of the transmission wave S to the reception of the reception wave R.

The central form in FIG. 3 is a state in which, compared to the left form, the operation of the recording apparatus 1 has progressed and the glue G on the return belt surface 20*b* has been consumed. For example, the thickness of the glue G is reduced to about 0.1 mm, and it is necessary to replace the transport belt 20 with a new one or to apply glue G to the transport belt 20. If the transport belt 20 continues to be used in this state, there is a possibility that the medium M on the forward belt surface 20*a* may slip.

In a state where the glue G on the return belt surface 20*b* is consumed, the ultrasonic sensor 12 can detect the distance D from the position of the ultrasonic sensor 12 to the return belt surface 20*b* as the second distance D2, based on the time from transmission of the transmission wave S to reception of the reception wave R. Note that first distance D1<second distance D2.

The right form in FIG. 3 is a state in which there is no glue G on the return belt surface 20*b*. In this case, when the ultrasonic sensor 12 uses the transmission section 12*a* to transmit the transmission wave S toward the return belt surface 20*b*, since there is no glue G, the transmission wave S is reflected by the return belt surface 20*b* itself and then becomes the reception wave R, which is received by the reception section 12*b*.

In a state where no glue G is on the return belt surface 20*b*, the ultrasonic sensor 12 can detect the distance D from the position of the ultrasonic sensor 12 to the return belt surface 20*b* as a third distance D3, based on the time from the transmission of the transmission wave S to the reception of the reception wave R. Note that second distance D2<third distance D3.

The third distance D3 can also be stored in the memory 11 by detecting, in advance by the ultrasonic sensor 12, the return belt surface 20*b* in a state where there is no glue G.

In addition, so that the controller 10 can use the second distance D2 and the third distance D3 when determining the state of the returning belt surface 20*b* as will be described later, the user can store the second distance D2 and the third distance D3 in the memory 11 using an external apparatus 3 or the touch panel of the notification section 16, to be described later.

The controller 10 compares the distance D detected by the ultrasonic sensor 12 with the second distance D2 stored in the memory 11 and when distance D second distance D2, the controller 10 can determine that the glue G on the return belt surface 20*b* is in a consumed state, and that the glue G on the entire transport belt 20 is in a consumed state. At this time, the controller 10 can use the notification section 16, to be described later, to notify information indicating that it is necessary to replace the transport belt 20 or to apply glue G to the transport belt 20.

In addition, the controller 10 compares the detected distance D with the second distance D2 and when the distance D<distance D2, can determine that the glue G on the return belt surface 20*b* is in a sufficient state, and the glue G on the entire transport belt 20 is also in a sufficient state. At this time, the controller 10 can use the notification section 16 to notify information indicating that the glue G on the transport belt 20 is in a sufficient state.

The controller 10 can also calculate the thickness of the glue G on the return belt surface 20*b* by comparing the distance D detected by the ultrasonic sensor 12 with the third distance D3 stored in the memory 11.

An example in which the controller 10 calculates the thickness of the glue G on the return belt surface 20*b* will be described. In the case of the left configuration in FIG. 3, the ultrasonic sensor 12 detects the distance D to the glue surface GS as the first distance D1. The controller 10 can compare the third distance D3, which is the case of no glue G being present, stored in the memory 11, and calculate the thickness of the glue G as G1=third distance D3−first distance D1.

In this case, since the calculated thickness G1 of the glue G is about 0.2 to 0.3 mm, the controller 10 can determine that the glue G is sufficiently present on the return belt surface 20*b* and the glue G of the entire transport belt 20 is also in a sufficient state.

Similarly, in the case of the central form in FIG. 3, the ultrasonic sensor 12 detects the distance D to the glue surface GS as the second distance D2. The controller 10 can compare the second distance D2 stored in the memory 11 and calculate the thickness of the glue G as G2=third distance D3−second distance D2.

In this case, since the calculated thickness G2 of the glue G is equal to or less than 0.1 mm, the controller 10 can determine that the glue G on the return belt surface 20*b* is in a consumed state and the glue G on the entire transport belt 20 is also in a consumed state.

In addition, the case of the central form in FIG. 3 indicates that the operation of the recording apparatus 1 has progressed and the glue G of the return belt surface 20*b* has been consumed compared to the left form, so the thickness of the glue G is G2<G1 and is thin.

The case of the form on the right in FIG. 3 indicates that operation of the recording apparatus 1 has proceeded further and that the glue G reaches a state without thickness, becoming 0=third distance D3−third distance D3.

Figure 4:
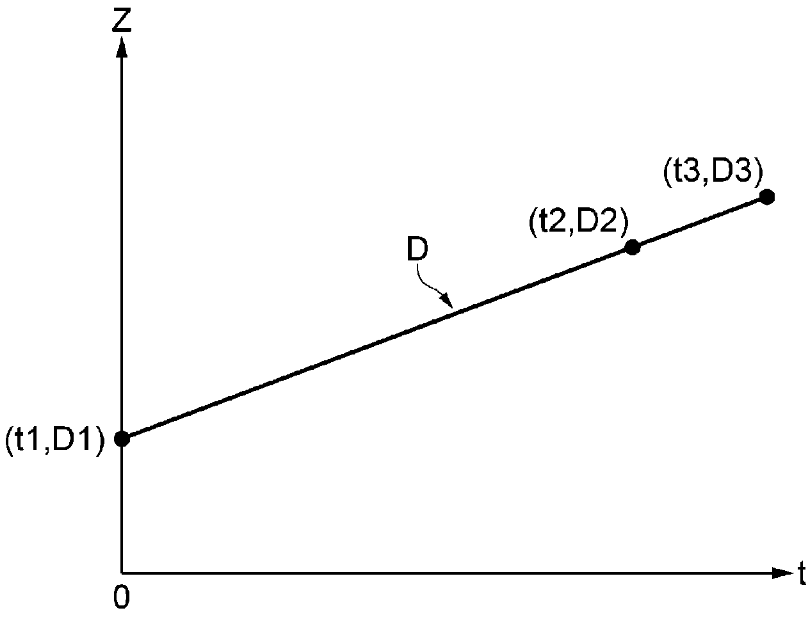
FIG. 4 is a characteristic diagram showing an example of a relationship between an operating time of the recording apparatus and a detection result of glue by the ultrasonic sensor.

FIG. 4 shows coordinates in which the horizontal axis represents the operating time t of the recording apparatus 1 and the vertical axis represents the temporal change Z in the distance D to the glue surface GS of the return belt surface 20*b* detected by the ultrasonic sensor 12.

(t1, D1) in FIG. 4 denotes a first distance D1 detected by the ultrasonic sensor at t1, which is before operation of the recording apparatus 1.

The first distance D1 shows an initial state in which there is sufficient glue G on the return belt surface 20*b*. Based on the first distance D1 detected by the ultrasonic sensor 12, the controller 10 can determine that the glue G is sufficiently present on the return belt surface 20*b*.

The recording apparatus 1 operates, and (t2, D2) indicates the second distance D2 detected by the ultrasonic sensor 12 at the operating time t2 of the recording apparatus 1.

The second distance D2 indicates that the glue G on the return belt surface 20*b* is in a consumed state. Based on the second distance D2 detected by the ultrasonic sensor 12, the controller 10 can determine that the operation of the recording apparatus 1 has progressed and that the glue G on the return belt surface 20*b* is in a consumed state.

Since the glue G of the entire transport belt 20 is not sufficient once an operating time t2 is exceeded, the controller 10 can also determine that there is a concern that slippage may start to occur between the forward belt surface 20*a* and the medium M, and that there is a concern that recording defects may occur. The controller 10 may be configured to stop the recording section 13 and the transport section 14.

Further, when the recording apparatus 1 operates and reaches (t3, D3), this indicates that at the operating time t3 of the recording apparatus 1, there is no more glue G and the distance from the ultrasonic sensor 12 to the return belt surface 20*b* is the third distance D3. The controller 10 can determine that there is no glue G on the entire transport belt 20, that slippage will frequently occur between the forward belt surface 20*a* and the medium M, and that most of the media M will be defectively recorded. The controller 10 can stop the recording section 13 and the transport section 14.

The memory 11 can store in advance a relationship of the temporal change in the distance D detected by the ultrasonic sensor 12 with respect to operating time of the recording apparatus 1 as illustrated in FIG. 4.

Based on the relationship of the temporal change of the distance D with respect to the operating time of the recording apparatus 1 stored in the memory 11, the controller 10 can predict the state of the entire transport belt 20 corresponding to the future operating time of the recording apparatus 1.

Specifically, the controller 10 can refer to the memory 11 based on the current distance D detected by the ultrasonic sensor 12 and, from the relationship of the temporal change of the distance D with respect to the operating time of the recording apparatus 1, determine the time when the glue G of the entire transport belt 20 will be consumed.

The controller 10 can use the notification section 16, to be described later, to notify information such as an operating time until the glue G will be used up, the time when the transport belt 20 should be replaced, and the time when glue G should be applied to the transport belt 20. In addition, when the time to replace the transport belt 20, the time to apply the glue G to the transport belt 20, or the like approaches, the controller 10 can also notify information that prompts preparation.

The relationship of the temporal change in the distance D with respect to the operating time of the recording apparatus 1 may differ depending on the type of the medium M. The memory 11 can also store, separately for each type of medium M, the relationship of the temporal change of the distance D with respect to the operating time of the recording apparatus 1.

As will be described later, the user can designate the type of the medium M using the external apparatus 3 or a touch panel of the notification section 16, to be described later. The controller 10 can also retrieve from the memory 11 the relationship of the temporal change in the distance D with respect to the operating time of the recording apparatus 1 corresponding to the type of the designated medium M, and predict the above-described timing.

When the transport section 14 includes the winding device as described above, a sensor may be provided for detecting a peeling angle of the medium M peeled off from the forward belt surface 20*a*. The peeling angle is an angle between the forward belt surface 20*a* and the medium M that was peeled off.

For example, the sensor is an ultrasonic sensor, and by detecting the distance from a predetermined position to the peeled off medium M in a non-contact manner, the controller 10 can calculate the peeling angle of the medium M that was peeled off from the forward belt surface 20*a*.

When the glue G on the forward belt surface 20*a* is consumed and the adhesiveness of the glue G deteriorates, the medium M is peeled off from the forward belt surface 20*a* further upstream in the circling direction. That is, as the glue G on the forward belt surface 20*a* is consumed, the peeling angle of the medium M decreases. The influence of the type of the medium M is also reflected in the peeling angle of the medium M.

The controller 10 can determine the state of the glue G on the return belt surface 20*b* using the ultrasonic sensor 12 and can determine the adhesiveness of the glue G on the forward belt surface 20*a* using the above-described sensor that detects the peeling angle of the medium M. By using the two sensors, the controller 10 can more reliably determine deterioration of the glue G on the transport belt 20, that reflects the influence of the type of the medium M.

For example, when the controller 10 determines that the glue G on the return belt surface 20*b* is being consumed using the ultrasonic sensor 12 and that the adhesive property of the glue G on the forward belt surface 20*a* is decreasing using the above-described sensor, the controller 10 can more reliably determine the deterioration of the glue G on the transport belt 20. The controller 10 can also use the notification section 16 to notify at a more appropriate time.

Returning to FIG. 2, the description of the configuration of the recording apparatus 1 will continue. The returning belt surface 20*b* cleaned by the cleaning section 30 is subjected to a process by the wiping section 31 of wiping off the cleaning liquid and foreign matter that cling to the returning belt surface 20*b*. As illustrated in FIG. 2, the wiping section 31 is provided downstream of the cleaning section 30 and upstream of the recording section 13 in the circling direction of the transport belt 20. The wiping section 31 includes a wiping blade 31*a* and an adjustment section 31*b*. The wiping blade 31*a* may be formed of rubber in a wiper shape or resin in a plate shape.

As the transport belt 20 is transported, the wiping blade 31*a* can wipe the moving return belt surface 20*b* while its tip end contacts the return belt surface 20*b*. The adjustment section 31*b* is configured to be able to adjust the position of the wiping blade 31*a* up and down under the control of the controller 10.

The controller 10 uses the adjustment section 31*b* to control the position of the wiping blade 31*a* according to the state of the returning belt surface 20*b*, which is the detection result of the ultrasonic sensor 12, and can adjust the load when the wiping blade 31*a* contacts the returning belt surface 20*b*.

As the position of the wiping blade 31*a* becomes higher, the load with which the wiping blade 31*a* contacts the return belt surface 20*b* increases, and the wiping blade 31*a* strongly rubs against the return belt surface 20*b*. As the position of the wiping blade 31*a* becomes lower, the load at which the wiping blade 31*a* contacts the return belt surface 20*b* decreases, and the wiping blade 31*a* weakly rubs against the return belt surface 20*b*.

In this way, the controller 10 can control the position of the wiping blade 31*a* using the adjustment section 31*b* and adjust the wiping state of the wiping blade 31*a* against the return belt surface 20*b*.

As described above, the glue G is provided on the surface of the transport belt 20. As the load with which the wiping blade 31*a* contacts the return belt surface 20*b* increases, the effect of wiping the cleaning liquid or the like clinging to the return belt surface 20*b* increases, but the glue G on the return belt surface 20*b* is more likely to be consumed. In addition, when the load becomes small, the opposite tendency is shown.

A controller 10 uses the adjustment section 31*b* to keep the wiping blade 31*a* at a prescribed position where it can contact the return belt surface 20*b* with a prescribed load. The controller 10 can reduce the load of the wiping blade 31*a* of the wiping section 31 by controlling the adjustment section 31*b* according to the detection result of the ultrasonic sensor 12.

Specifically, when the controller 10 determines, based on the detection result of the ultrasonic sensor 12, that the consumption of the glue G on the return belt surface 20*b* is progressing, the controller 10 controls the adjustment section 31*b* to move the position of the wiping blade 31*a* of the wiping section 31 downward continuously or in a stepwise manner from a predetermined position. The controller 10 can continuously or in a stepwise manner reduce the load of the wiping blade 31*a* on the returning belt surface 20*b* according to the detection result of the ultrasonic sensor 12. The controller 10 controls the wiping section 31 in accordance with the detection result of the ultrasonic sensor 12, and can suppress consumption of the glue G on the return belt surface 20*b*.

The return belt surface 20*b* from which the cleaning liquid or the like is wiped by the wiping section 31 is subjected to drying by the drying section 32 to dry off the cleaning liquid remaining on the return belt surface 20*b*. The drying section 32 is provided downstream of the wiping section 31 and upstream of the recording section 13 in the circling direction of the transport belt 20.

The drying section 32 includes at least one of a blower and a heater. The drying section 32 can dry the cleaning liquid clinging to the return belt surface 20*b* in a non-contact manner by using at least one of an air flow by a blower and heat by a heater.

The controller 10 can control the output such as the wattage of the heater or the air volume per unit of time of the blower of the drying section 32 based on the state of the returning belt surface 20*b* detected by the ultrasonic sensor 12, and can adjust the drying state of the returning belt surface 20*b*. For example, when the glue G on the return belt surface 20*b* is consumed, the cleaning liquid is likely to remain on the return belt surface 20*b*, and thus the controller 10 increases the output of the heater or the air volume of the drying section 32.

As described above, when the load of the wiping section 31 on the returning belt surface 20*b* is reduced, the controller 10 can increase the output such as the wattage of the heater or the air volume per unit of time of the blower of the drying section 32.

When the load with which the wiping section 31 contacts the return belt surface 20*b* is reduced, the effect of wiping the cleaning liquid that clings to the return belt surface 20*b* decreases, so the amount of remaining cleaning liquid increases. However, drying of the cleaning liquid remaining on the returning belt surface 20*b* can be promoted by increasing the output such as the wattage of the heater or the air volume per unit of time of the blower of the drying section 32.

It should be noted that only one of the wiping section 31 and the drying section 32 may be provided as long as a predetermined amount of cleaning liquid clinging to the returning belt surface 20*b* can be removed by the one. Alternatively, the wiping section 31 and the drying section 32 need not be provided as long as, due to the environment in which the recording apparatus 1 is installed, such as being installed in a dry environment, a predetermined amount of cleaning liquid is removed by the time the return belt surface 20*b* after being cleaned is conveyed and reaches the driven roller 14*b* or the recording section 13. Similarly, in a case where the cleaning section 30 is not provided, the wiping section 31 and the drying section 32 need not be provided.

The glue G can be applied by the application section 33 to the return belt surface 20*b* that has been subjected to drying treatment by the drying section 32. The application section 33 is provided downstream of the drying section 32 and upstream of the recording section 13 in the circling direction of the transport belt 20.

When the drying section 32 is provided, it is desirable that the application section 33 is provided downstream of the drying section 32 in the circling direction of the transport belt 20. The application section 33 can apply the glue G to the returning belt surface 20*b* which had the cleaning liquid dried. Accordingly, compared to a case where the glue G is applied in a state where the cleaning liquid remains on the return belt surface 20*b*, it is possible to improve fixability of the glue G to the transport belt 20.

The application section 33 includes an application roller 33*a* and a mover 33*b*. Glue G is applied to the surface of the application roller 33*a*. As the transport belt 20 is conveyed, the application roller 33*a* rotates while being in contact with the moving return belt surface 20*b*, to apply the glue G to the return belt surface 20*b*. In addition, it is desirable that the controller 10 rotates the transport belt 20 at least once while the application roller 33*a* of the application section 33 is in contact with the return belt surface 20*b*. The application section 33 can apply the glue G over the entire transport belt 20 in the transport direction.

The mover 33*b* is configured to move the position of the application roller 33*a* up and down under the control of the controller 10. When the glue G is not being applied, the controller 10 retracts and moves the application roller 33*a* to a lower position where the application roller 33*a* does not contact the return belt surface 20*b*.

When the glue G is to be applied to the return belt surface 20*b*, the controller 10 uses the mover 33*b* to move the application roller 33*a* toward the upper position so as to contact the return belt surface 20*b*. The controller 10 uses the mover 33*b* to move the application roller 33*a* to a position where the application roller 33*a* contacts the return belt surface 20*b* so that the glue G can be applied to the return belt surface 20*b*.

The application section 33 may be configured to also include a storage tank for storing the glue G, and so that the glue G is supplied from the storage tank to the application roller 33*a*.

The controller 10 can adjust the amount of glue G to be applied to the return belt surface 20*b* by using the mover 33*b* to adjust the position of the application roller 33*a*.

The controller 10 can apply a large amount of the glue G to the return belt surface 20*b* by bringing the application roller 33*a* into strong contact with the return belt surface 20*b* at a position higher than the position at the time of normal application. Contrarily, the controller 10 can apply a small amount of the glue G to the return belt surface 20*b* by bringing the application roller 33*a* into weak contact with the return belt surface 20*b* at a position lower than the position at the time of normal application.

The controller 10 can also adjust the amount of glue G to be applied to the return belt surface 20*b* by changing the distance of the moving transport belt 20 that is in a state in which the mover 33*b* brought the application roller 33*a* in contact with the return belt surface 20*b*. The longer the distance that the application roller 33*a* contacts the return belt surface 20*b*, the greater the amount of glue G that can be applied. In addition, the application section 33 may be configured to have at least one nozzle to eject the glue G from the at least one nozzle.

In this manner, the controller 10 can, based on the state of the return belt surface 20*b* detected by the ultrasonic sensor 12, select whether or not to use the application section 33 to apply the glue G to the return belt surface 20*b*. Further, the controller 10 can, based on the state of the return belt surface 20*b* detected by the ultrasonic sensor 12, adjust the amount of the glue G to be applied to the return belt surface 20*b*.

Figure 5:
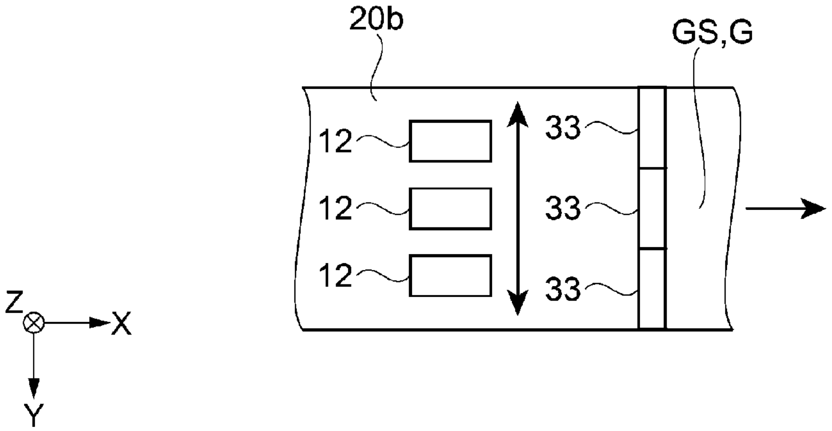
FIG. 5 is a diagram showing an example arrangement of the ultrasonic sensor and an application section.

As shown in FIG. 5, a plurality of ultrasonic sensors 12 can detect the state of the return belt surface 20*b* at a plurality of positions in the width direction along the return belt surface 20*b*, which is the front-rear direction of the recording apparatus 1 and is a direction intersecting the transport direction of the medium M, which is the left-right direction of the recording apparatus 1.

Note that a single ultrasonic sensor 12 may be mounted on a moving mechanism that moves in the width direction along the return belt surface 20*b*, which is the front-rear direction of the recording apparatus 1, and detect at a plurality of positions in the width direction of the return belt surface 20*b*. Although a case where a plurality of ultrasonic sensors 12 are installed will be described below, the same applies to a case where detection is performed at a plurality of positions by a single ultrasonic sensor 12 mounted on a moving mechanism.

Specifically, the plurality of ultrasonic sensors 12 are respectively installed at a plurality of positions in the width direction along the return belt surface 20*b*, which is the front-rear direction of the recording apparatus 1 and is a direction intersecting the transport direction of the medium M, which is the left-right direction of the recording apparatus 1, and the distance D to the glue surface GS of the return belt surface 20*b* can be detected at the plurality of positions. The controller 10 can use the plurality of ultrasonic sensors 12 to determine that the glue G at a specific position in the width direction of the returning belt surface 20*b* was consumed.

The controller 10 can control the application section 33 to apply the glue G to the return belt surface 20*b* in accordance with detection results by the plurality of ultrasonic sensors 12 at the plurality of positions in the width direction of the return belt surface 20*b*.

To be specific, the controller 10 compares the distances D detected by the ultrasonic sensors 12 at the plurality of positions in the widthwise direction of the return belt surface 20*b* with the second distance D2 stored in the memory 11, and determines that the glue G was consumed at a specific position where the detection result is distance D second distance D2. The controller 10 can control the mover 33*b* of the application section 33 to move the application roller 33*a* to a position where the application roller 33*a* contacts the return belt surface 20*b*, so that the glue G can be applied to the return belt surface 20*b*.

As illustrated in FIG. 5, a plurality of application sections 33 may be installed at positions corresponding to the plurality of ultrasonic sensors 12 in the transport direction of the medium M, which is the left-right direction of the recording apparatus 1. In other words, it is possible to install each of the plurality of application sections 33 at a plurality of positions in the width direction along the return belt surface 20*b*, which is the front-rear direction of the recording apparatus 1 and is the direction intersecting the transport direction of the medium M, which is the left-right direction of the recording apparatus 1.

When the controller 10, by using the plurality of ultrasonic sensors 12, determines that the glue G at a specific position in the width direction of the return belt surface 20*b* was consumed, the controller 10 can select and control the application section 33 at the corresponding specific position, to apply glue G at the specific position on the return belt surface 20*b*.

In this way, the controller 10 can, in accordance with the detection results of the plurality of ultrasonic sensors 12, select and control, from amongst the plurality of application sections 33, the application section 33 at the specific position where the glue G was consumed. By selecting from among the plurality of application sections 33, the controller 10 can automatically and suitably apply glue G to the portion of the transport belt 20 to which the glue G should be applied, and thus convenience for the user is improved.

Instead of the application roller 33*a*, a blade-shaped application device may be provided and glue G may be applied to the return belt surface 20*b* by bringing the tip into contact with the return belt surface 20*b*. Instead of the application roller 33*a*, a brush or the like may be provided.

The glue G may be supplied to the blade-shaped applicator from a reservoir of glue G. In the case where the glue G is composed of a plurality of materials, a stirring device may be provided in the reservoir of the glue G so as to mix the plurality of materials.

Further, the application section 33 may be detachably provided in the recording apparatus 1. When the user does not use the application section 33, the user can remove the application section 33. The user can attach the application section 33 to the recording apparatus 1 based on a notification of the notification section 16, to be described later.

Since the user only needs to prepare the glue G when attaching the application section 33 to the recording apparatus 1, it is possible to suppress deterioration of the glue G by contact with air.

The communication section 15 illustrated in FIG. 1 includes a communication circuit capable of performing wired communication or wireless communication with the external apparatus 3. The external apparatus 3 is, for example, a computer, a server, or the like. The communication section 15 receives from the external apparatus 3 recording data to be recorded on the medium M. The recording data may be stored in the memory 11 or may be retrieved from a storage medium by a retrieving device provided in the memory 11.

Further, as described above, the communication section 15 can receive, from the external apparatus 3 by the user, the second distance D2 from the position of the ultrasonic sensor 12 to the return belt surface 20*b* in a state where the glue G was consumed and the third distance D3 from the position of the ultrasonic sensor 12 to the return belt surface 20*b* in a state where no glue G is present. The controller 10 stores the second distance D2 and the third distance D3 received by the communication section 15 in the memory 11, and can use them when determining the states of the return belt surface 20*b* and the transport belt 20.

In addition, as described above, the communication section 15 can receive, from the external apparatus 3 by the user, the type of the medium M and store it in the memory 11.

As illustrated in FIG. 1, the recording apparatus 1 includes a notification section 16 including a touch panel. The notification section 16 may include a speaker. Specifically, the notification section 16 can notify the user by displaying information such as a message on a touch panel or by a voice from a speaker.

As described above, the controller 10 compares the distances D detected by the ultrasonic sensor 12 with the second distance D2 stored in the memory 11, and when distance D second distance D2, can use the notification section 16 to notify the user of information indicating that the transport belt 20 needs to be replaced or the glue G needs to be applied to the transport belt 20.

The controller 10 can predict that the replacement time of the transport belt 20 is approaching or that the time to apply the glue G to the transport belt 20 is approaching, and use the notification section 16 to notify the user of information indicating this.

When distance D<second distance D2, the controller 10 can, via the notification section 16, notify the user of information indicating that the glue G is sufficient.

As described above, the controller 10 can acquire the second distance D2 and the third distance D3 via a user operation at a touch panel of the notification section 16 and store them in the memory 11.

As described above, the controller 10 can also acquire the type of the medium M via a user operation of the touch panel of the notification section 16 and store the type in the memory 11.

Furthermore, the user may store only one of the second distance D2 or the third distance D3 in the memory 11 via an instruction from the external apparatus 3 or an operation of the touch panel of the notification section 16. When the controller 10 uses the second distance D2 to determine the state of the glue G on the transport belt 20, the controller 10 can use the third distance D3 instead. In this case, the controller 10 may multiply the third distance D3 by, for example, 90% and use the result for the determination instead of the second distance D2. The user can also set this ratio by an instruction from the external apparatus 3 or an operation on the touch panel of the notification section 16.

In addition, even in a case where only the second distance D2 is stored, the user may be able to set the ratio of the second distance D2 when the controller 10 uses the second distance D2 for determination, and can set the ratio by an instruction from the external apparatus 3 or an operation of the touch panel of the notification section 16. For example, when the user sets the second distance D2 to 90%, the controller 10 can refer to the memory 11 and notify the user via the notification section 16 when the second distance D2 becomes 90%.

As described above, the user can arbitrarily set a value used by the controller 10 to determine the state of the transport belt 20.

1-2. Configuration of Transport Apparatus

As shown in FIGS. 7 and 8, the transport apparatus 2 has a configuration in which at least the recording section 13 is removed from the recording apparatus 1, and common portions are denoted by common reference numerals. The transport apparatus 2 includes a controller 10, a memory 11, an ultrasonic sensor 12, a transport section 14, a communication section 15, a notification section 16, a cleaning section 30, a wiping section 31, a drying section 32, and an application section 33.

The controller 10 reads out the firmware of the memory 11 and controls the transport section 14 to transport the medium M. Furthermore, with respect to the return belt surface 20*b*, which is a surface of the transport belt 20 after transport, the controller 10 controls, along the circling direction of the transport belt 20, cleaning by the cleaning section 30, detection of the state of the return belt surface 20*b* by the ultrasonic sensor 12 and, according to the detection results, controls wiping of the cleaning liquid by the wiping section 31, drying by the drying section 32, glue application by the application section 33, notification by the notification section 16 or the communication section 15, and the like.

Configurations of different sections of the transport apparatus 2 are the same as those of the recording apparatus 1 described above, and thus descriptions thereof will be omitted.

1-3. Control Method of Recording Apparatus

Figure 6:
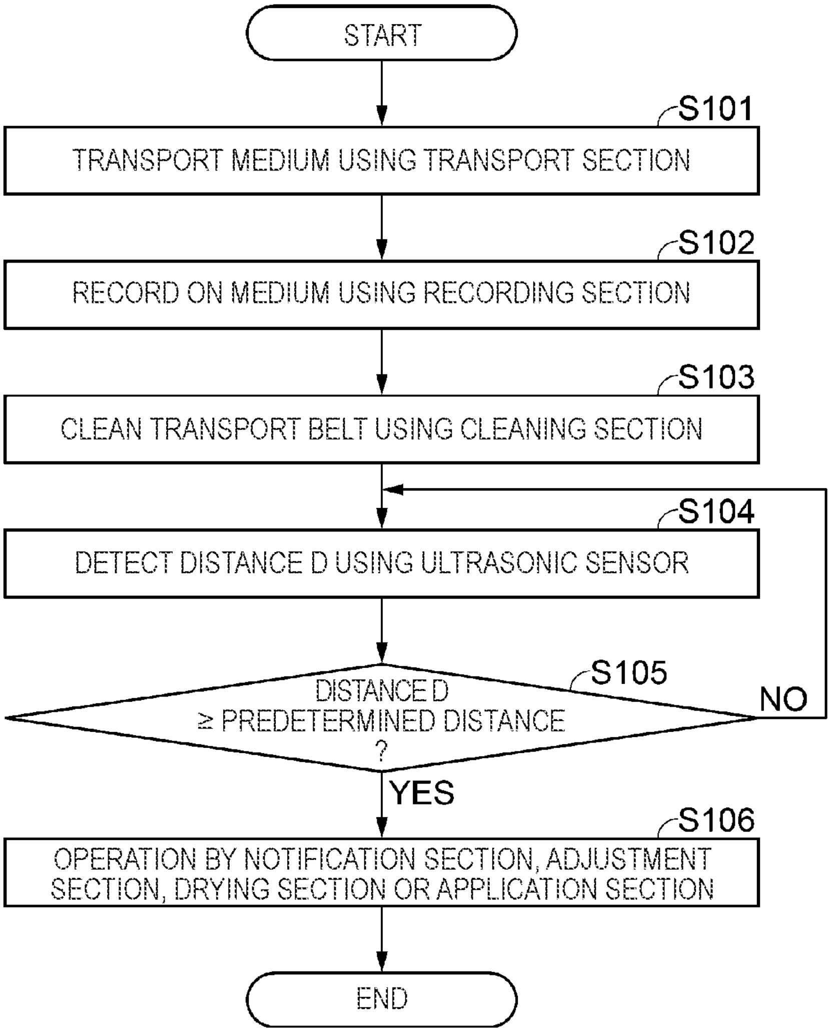
FIG. 6 is a flowchart showing an example of a control method by a controller.

A control method of the recording apparatus 1 will be described with reference to FIGS. 1 and 2, while referring to the flowchart shown in FIG. 6.

The controller 10 acquires recording data from the external apparatus 3 via the communication section 15, or acquires recording data from the memory 11 via a user operation at the touch panel of the notification section 16. When the controller 10 retrieves the recording data, the controller 10 causes the transport section 14 to transport the medium M (S101). Specifically, the controller 10 drives the driving roller 14*a* to rotate the transport belt 20 in the circling direction. Glue G is provided on the surface of the transport belt 20, and the forward belt surface 20*a* can convey the medium M by adheringly fixing the medium M in place.

When the medium M is transported by the transport section 14 to the position of the recording section 13, the controller 10 uses the recording section 13 to record on the medium M (S102). As will be described later, this process is not executed in the case of the transport apparatus 2.

The controller 10 can further transport the medium M using the transport section 14 and peel the medium M, on which recording by the recording section 13 has been completed, off from the forward belt surface 20*a*.

The returning belt surface 20*b* from which the medium M was peeled off is cleaned by the cleaning section 30 (S103). Foreign matter such as clinging ink can be removed from the return belt surface 20*b* by the cleaning section 30.

The ultrasonic sensor 12 detects a detection target region 20*c*, which is at least a portion of the return belt surface 20*b* from downstream of the cleaning section 30 to upstream of the wiping section 31 with respect to the circling direction of the transport belt 20.

The ultrasonic sensor 12 detects a distance D to the return belt surface 20*b* (S104). The controller 10 compares the distance D detected by the ultrasonic sensor 12 with the second distance D2, which is a predetermined distance stored in the memory 11 (S105).

When the controller 10 determines that the state of distance D second distance D2 has been reached (S105: YES), the controller 10 can determine that the state of the return belt surface 20*b* is a state in which the glue G has been consumed and the state of the entire transport belt 20 is also a state in which the glue G has been consumed. Then, the controller 10 can cause the notification section 16, the adjustment section 31*b* of the wiping section 31, the drying section 32, or the application section 33 to operate (S106).

On the other hand, when the controller 10 determines that distance D≤second distance D2 (S105: NO), the controller 10 can determine that the state of the return belt surface 20*b* is a state in which there is sufficient glue G and the state of the entire transport belt 20 is also a state in which there is sufficient glue G. The controller 10 continues detection by the ultrasonic sensor 12 of the distance D to the return belt surface 20*b*.

The case in which the controller 10 causes the notification section 16, the adjustment section 31*b* of the wiping section 31, the drying section 32, or the application section 33 to operate (S106) will be specifically described.

The controller 10 can use the notification section 16 to notify to the user information indicating that it is necessary to replace the transport belt 20 or to apply glue G to the transport belt 20.

Alternatively, the controller 10 controls the adjustment section 31*b* of the wiping section 31 to adjust the position of the wiping blade 31*a* downward. The load at which the wiping blade 31*a* contacts the return belt surface 20*b* decreases, and the wiping blade 31*a* weakly rubs against the return belt surface 20*b*. As a result, the effect of wiping the cleaning liquid clinging to the return belt surface 20*b* is reduced, but consumption of the glue G on the return belt surface 20*b* can be suppressed.

Alternatively, the controller 10 may increase the air volume per unit of time of the blower of the drying section 32 or increase the output such as the wattage of the heater to promote drying of the return belt surface 20*b*.

Alternatively, the controller 10 can use the application section 33 to apply glue G to the return belt surface 20*b*.

When the controller 10 determines that the glue G on the return belt surface 20*b* and the transport belt 20 is in a consumed state, the controller 10 can operate at least one from amongst these.

Here, a case where the controller 10 controls the drying section 32 will be described in detail. First, it will be described about the controller 10 being able to detect the presence or absence of the cleaning liquid clinging to the returning belt surface 20*b* using the ultrasonic sensor 12.

When the glue G on the return belt surface 20*b* is compared with the clinging cleaning liquid, the thickness of the glue G is about 0.3 mm as described above, whereas the clinging cleaning liquid is about 1 mm, which is larger than the thickness of the glue G. The controller 10 can distinguish between the glue G on the return belt surface 20*b* and the clinging cleaning liquid by the difference in the distance D detected by the ultrasonic sensor 12.

The thickness of the glue G is uniform in the transport direction of the transport belt 20, which is the left-right direction of the recording apparatus 1. On the other hand, the cleaning liquid clings locally to the returning belt surface 20*b*. The ultrasonic sensor 12 detects the returning belt surface 20*b* a plurality of times while conveying the transport belt 20, and when the detected distance D differs depending on the detected part, the controller 10 can determine that the cleaning liquid clings to the returning belt surface 20*b*. On the other hand, when the detected distance D is constant, the controller 10 can determine it as the thickness of the glue G.

The cleaning liquid clinging to the return belt surface 20*b* may be colored by ink or the like, or may be turbid due to foreign matter or the like. When an attempt is made to detect such cleaning liquid, a sensor using light tends to be affected by the detection light being absorbed by ink, foreign matter, or the like, and accurate detection may not be possible. However, since the ultrasonic sensor 12 uses ultrasonic waves, accurate detection is possible even with such a cleaning liquid, because the detection does not tend to be affected by ink, foreign matter, or the like.

The controller 10 can discriminate between the glue G on the return belt surface 20*b* and the clinging cleaning liquid based on such a difference in the detection result of the ultrasonic sensor 12. Foreign matter such as dust clinging to the returning belt surface 20*b* can also be distinguished in the same manner as in the case of the cleaning liquid.

For example, when the controller 10 determines, based on the detection result of the ultrasonic sensor 12, that a large amount of cleaning liquid is clinging to the returning belt surface 20*b*, the controller 10 can promote drying by increasing the air volume per unit of time of the blower of the drying section 32 or increasing the output such as the wattage of the heater.

The control method of the transport apparatus 2 is the same as that of the recording apparatus 1 described above, except for the control by the recording section 13. Specifically, since the transport apparatus 2 has a configuration compared to that of the recording apparatus 1 in which at least the recording section 13 is removed, the controller 10 of the transport apparatus 2 does not execute recording by the recording section 13 on the medium M (S102). Other controls executed by the controller 10 of the transport apparatus 2 are the same as those in the case of the control method of the recording apparatus 1 described above, and thus description thereof will be omitted.

As described above, since the recording apparatus 1 and the transport apparatus 2 can detect the state of the transport belt 20 using the ultrasonic sensor 12 in a non-contact manner, the glue G on the return belt surface 20*b* is not consumed, and the adhesiveness of the transport belt 20 to the medium M is not deteriorated, by contact during detection.

Although these embodiments have been described in detail with reference to the drawings, specific configurations are not limited to these embodiments, and may be changed, replaced, deleted, or the like without departing from the scope of the present disclosure.

For example, in the above-described example, the recording section 13 of the recording apparatus 1 is described as a serial type in which the head 13*a* is mounted on the carriage 13*b* and moves, but may be a line type in which the head 13*a* is fixed without the carriage 13*b*. In addition, in the above-described example, the head 13*a* of the ink jet system is described, but a recording system of the head is not limited thereto. A sublimation method, a transfer method, or an electrophotographic method may be used.

In the recording apparatus 1 and the transport apparatus 2, assuming that the driving roller 14*a* of the transport section 14 is the starting point, the cleaning section 30, the ultrasonic sensor 12, the wiping section 31, the drying section 32, and the application section 33 were disposed in this order from upstream to downstream in the circling direction of the transport belt 20. In the recording apparatus 1 and the transport apparatus 2, the order of these components may be arbitrarily changed. For example, in the recording apparatus 1 and the transport apparatus 2, the ultrasonic sensor 12 may be disposed downstream of the wiping section 31 or the drying section 32. The ultrasonic sensor 12 can detect the glue G on the transport belt 20 at any place. In addition, the recording apparatus 1 and the transport apparatus 2 need not include optional components. For example, as long as the cleaning liquid clinging to the returning belt surface 20*b* can be removed by either the wiping section 31 or the drying section 32, either one may be provided, and the other need not be provided.

Hereinafter, contents derived from the above-described embodiments will be described.

The recording apparatus 1 includes the recording section 13 capable of recording on the medium M, the transport belt 20 that is provided with glue G capable of adhering with the medium M and that is capable of transporting the medium M, the ultrasonic sensor 12 that transmits ultrasonic waves to the surface of the glue G and that receives ultrasonic waves reflected from the surface, and the controller 10 capable of determining the state of the surface based on the detection result of the ultrasonic sensor 12.

When ultrasonic waves are transmitted from the ultrasonic sensor 12 to the surface of the glue G, if the surface of the glue G has been consumed, the distance from the surface of the glue G to the ultrasonic sensor 12 becomes longer compared to when the surface of the glue G has not been consumed. By using this, the recording apparatus 1 can detect the degree of deterioration, such as consumption of the glue G, using the ultrasonic sensor 12. According to the above configuration, the recording apparatus 1 can detect the degree of deterioration of the glue G by using the ultrasonic sensor 12, which is a non-contact type sensor. Therefore, the recording apparatus 1 can suppress deterioration of the glue G that occurs with a contact type sensor. Also, unlike a sensor using light, the ultrasonic sensor 12 of the recording apparatus 1 is not affected by color from the cleaning liquid and the like at the time of detection.

It is desirable that the recording apparatus 1 described above includes the application section 33 capable of applying the glue G to the surface, that the ultrasonic sensor 12 is capable of detecting the state of the surface at a plurality of positions in the width direction, the width direction intersecting the transport direction of the medium M and that is along the surface, and that the controller 10 controls the application section 33 according to the detection result of the ultrasonic sensor 12.

According to the above-described configuration, the recording apparatus 1 can, for example, detect a portion on the surface of the transport belt 20 to which the glue G is to be applied, and automatically and suitably apply the glue G to the portion, so that there is no need for the user to apply glue G and convenience is improved.

It is desirable that the recording apparatus 1 include the cleaning section 30 that can clean the surface of the transport belt 20 using liquid, the wiping section 31 that is provided downstream of the cleaning section 30 and upstream of the recording section 13 in the circling direction of the transport belt 20 and that wipes the surface by contacting the surface, and the adjustment section 31*b* that can adjust the load of the wiping section 31 on the surface, and that the ultrasonic sensor 12 is configured to be capable of detecting a state of the detection target region 20*c*, which is at least a part of surface from downstream of the cleaning section 30 to upstream of the wiping section 31 with respect to the circling direction, and that the controller 10 decreases the load of the wiping section 31 by controlling the adjustment section 31*b* according to a detection result by the ultrasonic sensor 12.

According to the above-described configuration, since the recording apparatus 1 reduces the load of the wiping section 31 on the transport belt 20 by the adjustment section 31*b* in accordance with the detection result of the ultrasonic sensor 12, it is possible to suppress further deterioration of the glue G due to the load of the wiping section 31.

It is desirable that the recording apparatus 1 includes the drying section 32 that is provided downstream of the wiping section 31 and upstream of the recording section 13 in the circling direction and that dries the surface by at least one of air flow or heat, and that the controller 10 increases the output of the drying section 32 when the load of the wiping section 31 is reduced.

When the load of the wiping section 31 decreases, liquid of the cleaning section 30 tends to remain on the surface of the transport belt 20. According to the above-described configuration, the recording apparatus 1 increases the output of the drying section 32 when the load of the wiping section 31 is reduced, thereby promoting the drying of the liquid remaining on the surface of the transport belt 20. The recording apparatus 1 can suppress an increase in the degree of liquid remaining on the transport belt 20 due to a decrease in the load of the wiping section 31.

The transport apparatus 2 includes the transport belt 20 that is provided with glue G capable of adhering with the medium M and that is capable of transporting the medium M, the ultrasonic sensor 12 including the transmission section 12*a* that transmits ultrasonic waves to the surface of the glue G and the reception section 12*b* that receives ultrasonic waves reflected from the surface, and the controller 10 capable of determining the state of the surface based on the detection result of the ultrasonic sensor 12.

When ultrasonic waves are transmitted from the ultrasonic sensor 12 to the surface of the glue G, if the surface of the glue G has been consumed, the distance from the surface of the glue G to the ultrasonic sensor 12 becomes longer compared to when the surface of the glue G has not been consumed. By using this, the transport apparatus 2 can detect the degree of deterioration, such as consumption of the glue G, using the ultrasonic sensor 12. According to the above configuration, the transport apparatus 2 can detect the degree of deterioration of the glue G by using the ultrasonic sensor 12, which is a non-contact type sensor. Therefore, the transport apparatus 2 can suppress deterioration of the glue G that occurs with a contact type sensor. Also, unlike a sensor using light, the ultrasonic sensor 12 of the transport apparatus 2 is not affected by color from the cleaning liquid and the like at the time of detection.

What is claimed is:

1. A recording apparatus comprising:

a recording section configured to record on a medium;

a transport belt that is provided with an adhesive adherable with the medium and that is configured to transport the medium;

an ultrasonic sensor that transmits ultrasonic waves to a surface of the adhesive and that receives ultrasonic waves reflected from the surface; and a controller configured to determine a state of the surface of the adhesive based on a detection result of the ultrasonic sensor.

2. The recording apparatus according to claim 1, comprising:

an application section configured to apply the adhesive to the surface, wherein the ultrasonic sensor is configured to detect the state of the surface at a plurality of positions in a width direction, the width direction intersecting with a transport direction of the medium and that is along the surface, and the controller controls the application section in accordance with a detection result of the ultrasonic sensor.

3. The recording apparatus according to claim 1, further comprising:

a cleaning section configured to clean the surface using liquid;

a wiping section that is provided downstream of the cleaning section and upstream of the recording section in a circling direction of the transport belt and that wipes the surface by contacting the surface; and an adjustment section configured to adjust a load of the wiping section against the surface, wherein the ultrasonic sensor is configured to detect a state of a detection target region, the detection target region being at least a part of the surface from downstream of the cleaning section to upstream of the wiping section with respect to the circling direction and the controller decreases the load of the wiping section by controlling the adjustment section in accordance with a detection result of the ultrasonic sensor.

4. The recording apparatus according to claim 3, further comprising:

a drying section that is provided downstream of the wiping section and upstream of the recording section in the circling direction and that dries the surface by at least one of air flow or heat, wherein the controller increases output of the drying section in a case where the load of the wiping section is reduced.

5. A transport apparatus comprising:

a transport belt that is provided with an adhesive adherable with the medium and that is configured to transport a medium;

an ultrasonic sensor including a transmission section that transmits ultrasonic waves to a surface of the adhesive and a reception section that receives ultrasonic waves reflected from the surface; and a controller configured to determine a state of the surface of the adhesive based on a detection result of the ultrasonic sensor.

* * * * *